United States Patent [19]

Doan et al.

[11] 3,912,528

[45] Oct. 14, 1975

[54] ADDITIVES TO IMPROVE FROTHING AGENTS IN GYPSUM BOARD MANUFACTURE

[75] Inventors: Robert B. Doan, Drexel Hill; Robert C. Taylor, King of Prussia, both of Pa.; Max H. Reynolds, Homewood, Ill.

[73] Assignee: Atlantic Richfield Company, Los Angeles, Calif.

[22] Filed: Aug. 20, 1973

[21] Appl. No.: 390,154

Related U.S. Application Data

[63] Continuation of Ser. No. 179,170, Sept. 9, 1971, abandoned.

[52] U.S. Cl. .................................. 106/111; 156/43
[51] Int. Cl.$^2$ ..................... B32B 5/20; C04B 11/14
[58] Field of Search .............. 156/39, 43, 78, 79; 106/111; 252/307, 558, 352, 356, DIG. 2

[56] References Cited
UNITED STATES PATENTS

| 2,500,024 | 3/1950 | Cornell et al. ...................... 252/559 |
| 3,031,498 | 4/1962 | Pengilly .............................. 252/558 |
| 3,060,137 | 10/1962 | Gemeinhardt et al. ............. 264/321 |
| 3,194,770 | 7/1965 | Hostettler ..................... 260/77.5 AB |
| 3,544,344 | 12/1970 | Pratt et al. .......................... 106/111 |
| 3,563,777 | 2/1971 | Pratt et al. .......................... 106/111 |
| 3,577,248 | 5/1971 | Doan et al. ......................... 106/111 |
| 3,615,784 | 10/1971 | Cattanach ........................... 252/352 |
| 3,634,271 | 1/1972 | Friedman et al. .................. 252/558 |
| 3,681,253 | 8/1972 | Arthur et al. ....................... 252/307 |

*Primary Examiner*—Charles E. Van Horn
*Assistant Examiner*—Basil J. Lewris
*Attorney, Agent, or Firm*—Coleman R. Reap

[57] ABSTRACT

This invention relates to gypsum slurry and to a method for producing gypsum board which utilizes as a frothing agent a mixture comprising 5 to 40 weight per cent of a compound selected from the group consisting of monohydric alcohols, glycols, glycol ethers, ketones and esters having 9 or less carbon atoms, up to 40 weight per cent water and 20 to 70 weight per cent of an alkyl benzene sulfonate having a branched or linear secondary alkyl side chain with an average carbon content ranging from 6 to 15 and a maximum carbon number spread of 8 carbon atoms. Preferably, the average carbon content ranges from 9.5 to 12.5 and the carbon number spread is a maximum of 5 carbon atoms. This frothing agent is generally utilized in amounts ranging from 0.01 to 0.1 part per 100 parts by weight gypsum.

12 Claims, No Drawings

ADDITIVES TO IMPROVE FROTHING AGENTS IN GYPSUM BOARD MANUFACTURE

This is a continuation, of application Ser. No. 179,170 filed Sept. 9, 1971, now abandoned.

BACKGROUND OF THE INVENTION

In the production of gypsum board a fluid gypsum slurry is spread between two impervious barriers such as paper sheet and the resultant composition is then heated until the free water has evaporated and the gypsum has set. Because of the weight of gypsum, it has become the practice in the industry to incorporate air bubbles into the core to lower the density of the final board. This is accomplished by incorporating a froth or foam into the slurry prior to the evaporation of water. The froth is prepared by agitating an aqueous solution of a frothing agent such as rosin soap. Attempts have been made to utilize in commercial operations synthetic detergents such as alkyl benzene sulfonates having alkyl side chains containing from 11 to 13 carbon atoms which have been very successful in other fields such as dishwashing and clothes washing. It was found, however, that the amount and stability of the foam generated by these frothing agents was not sufficient to insure uniform low density throughout the board.

U.S. Pat. No. 3,577,248 of May 4, 1971, describes in detail the advantages of incorporating alkyl benzene sulfonates having a linear secondary alkyl side chain with an average carbon content ranging from 8.5 to 10.5 as a frothing agent for gypsum slurries. This patent also describes how these frothing agents are utilized in gypsum board production and the patent is hereby incorporated by reference into this specification.

OBJECTIVES OF THE INVENTION

An object of the present invention is to provide an improved frothing agent for gypsum slurry.

A further object is to provide a frothing agent which will cause a gypsum slurry to attain its maximum foaming in the shortest possible time.

Another object is to provide a frothing agent which causes a gypsum slurry to remain in its foamed condition for extended periods of time.

It is a further object of this invention to provide a new light-weight gypsum board having uniform density characteristics.

It has been discovered that alkyl benzene sulfonate having a linear secondary alkyl side chain with an average carbon content ranging from 6 to 15 and a maximum carbon number spread of 8 carbon atoms will have improved frothing characteristics when used in combination with certain alcohols, glycols, esters, and ketones. These additives appear to show synergistic effects with the linear alkyl benzene sulfonate to produce quicker foaming, greater foam volume, and more stable foam than the sulfonates alone.

The alkyl benzene sulfonates which can be utilized in the practice of this invention have the following structural formula

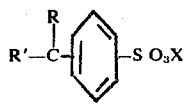

wherein R and R' are linear alkyl radicals and the average carbon content of the sum of R and R' ranges from 7.5 to 14. X is an alkali metal ion or ammonium. It has been found that while alkyl benzene sulfonates wherein R+R' ranges from 7.5 to 8.5 impart uniform density to the board their efficiency is impaired by the presence of certain accelerators or retarders such as starch. Preferably, therefore, the average carbon content resulting from the sum of R+R' ranges from 9.5 to 12.5 and the maximum carbon number spread is 5. The most suitable salts are those in which sodium or ammonium is the cation. The sodium salts are preferred.

The alkyl benzene sulfonates of this invention can be prepared by subjecting a linear olefin or a secondary linear alkyl chloride or alcohol and benzene to an alkylation environment in the presence of an alkylation catalyst such as $AlCl_3$, HF, $H_2SO_4$ or $BF_3$. The alkylated benzene can then be sulfonated utilizing reagents such as sulfuric acid, sulfur trioxide or oleum. The sulfonated portion of the molecule is then neutralized by reaction with an alkali metal compound such as sodium hydroxide or an ammonium compound such as ammonia or ammonium hydroxide.

The alcohols which can be utilized in the practice of this invention are monohydric alcohols and may contain 2 to 9 carbon atoms, preferably, 2 to 5 carbon atoms. Examples of those included are isopropanol, t-butyl alcohol and amyl alcohol.

The glycols and glycol ethers which may be utilized in this invention contain from 2 to 9 carbon atoms, and preferably, from 4 to 9 carbon atoms. They must be water-soluble, and examples of the glycols include ethylene glycol and propylene glycol. Glycol ethers including di, and tri propylene glycol and mixed polyglycols having a molecular weight up to about 700 can also be used.

Suitable ketones for this invention include those having 2 to 9 carbon atoms and, preferably, 3 to 6 carbon atoms. An example is methylethyl ketone.

Suitable esters include those having 2 to 9 carbon atoms and, preferably, those containing 3 to 5 carbon atoms. An example is ethyl acetate.

The light-weight gypsum boards of this invention can be prepared by placing a froth-containing gypsum slurry between two impervious barriers and then evaporating the free water to allow the gypsum to set. The slurry is prepared by adding gypsum to water and agitating. The amount of water will vary depending upon the type of gypsum and the strength and density of the desired board. Generally, the water ranges from 60 to 130 parts per 100 parts gypsum. The froth can be generated in the slurry by adding a frothing agent of this invention and then agitating the mixture until the desired level of foam is produced. Alternatively, the foam is first prepared and then added to the slurry. The amount of frothing agent utilized will be an effective amount which results in the desired density of the board. Other factors which dictate the proper frothing agent loading include the type of gypsum, the hardness of the water and the specific foaming properties of the frothing agent. For most commercial operations the amounts of frothing agent ranges from 0.001 to 1 part per 100 parts gypsum. Optimum loadings are usually in the range of 0.01 to 0.1 part per 100 parts gypsum.

After depositing the slurry between two impervious barriers such as paper sheets, the mixture is then subjected to heat usually at about 250°F. to 350°F. to evaporate the water and allow the gypsum to set. Additional components such as builders or stabilizers can be added to the froth to enhance or increase its basic properties. Various commercial methods of producing gypsum board are well-known in the art as exemplified by U.S. Pat. Nos. 2,560,521; 2,432,963; 2,207,339; and 3,343,818 which are hereby incorporated by reference into this specification.

Various additives can also be utilized to aid in the setting. For example, accelerators such as ground gypsum, potassium sulfate or ammonium sulfate can be added to improve setting rates. Additives such as starch or glue can be added to retard setting at the surface of barriers and thus provide a better core-to-barrier bond. Structural elements such as fibers or ground paper can also be incorporated to alter the strength characteristics of the final board. Most additives are utilized in amounts ranging from 0.1 to 2 parts per 100 parts gypsum.

A 60 weight per cent linear alkyl benzene sulfonate composition normally contains 40 per cent water. The per cent of linear alkyl benzene sulfonate in the frothing composition can vary, and it is within the teachings of this invention that the per cent of alkyl benzene sulfonate can vary between 20 and 70 weight per cent. The weight per cent of the alcohol, glycol, glycol ether, ketone, or ester can vary between 5 and 40 weight per cent; the balance of the composition being water. This frothing composition, depending upon the per cent of the various components, can be a clear heterogeneous solution or a pumpable slurry; and in either situation, the frothing effect upon the gypsum is beneficial when compared to that of known frothing agents. In order to show the beneficial effects obtained through practice of this invention, a recognized test of the plasterboard manufacturers has been utilized, called the Hamilton Beach Mixer test. This test provides a way to measure the speed of foam generation, the quantity of foam per unit of weight, and the stability of the foam through drainage observations. Conditions can be varied in regard to water hardness, water temperature, and the effect of various additives.

With respect to the examples which follow, water was used having a hardness of 500 parts per million and a temperature of 40°F. These are generally considered extreme conditions, not conducive to foam formation. As a basis for comparison, 2 grams of the frothing agent was placed in solution with distilled water to form 100 ml. of a 2 per cent test solution. 5 ml. of this solution was mixed with 155 ml. of the hard water and 8 grams of plaster of paris was added. Upon mixing, one could note the time in seconds to generate a specific amount of foam such as 500, 600, or 700 ccs. At 120 seconds, a final reading of the amount of foam generated was taken. To determine stability of the foam, readings were taken on the amount of water which settled out at one, two, and five minute intervals after the mixer was stopped. The more rapid the rate of accumulation of water would tend to indicate the breakdown of the froth or foam.

EXAMPLE 1

With respect to a solution using only alkyl benzene sulfonate as the frothing agent under the aforementioned conditions, it took 55 seconds to produce 500 cc of foam; and at the end of 2 minutes the total foam produced was 550 cc. With respect to drainage, over a 5 minute period, it was noted that 40 cc of water drained out in one minute, 75 cc in 2 minutes, and 120 cc in 5 minutes, leaving a final foam height of 545 ml.

Examples 1 through 31 were made using a frothing agent containing 60 weight per cent of a linear alkyl benzene sulfonate having an average of 10.3 carbon atoms in the chain with a maximum spread of 3 carbon atoms. The additives used in Examples 2 through 31 and the amount of the additive is indicated by weight per cent. Where 40 weight per cent of the additive is indicated, water is generally present as a diluent as indicated in the procedure outlined above. The results from Example 1 are repeated in tabular form for ease of comparison with the runs using the various additives.

Examples 30 and 31 utilized as the frothing agent, 100 per cent of two of the more effective additives with no alkyl benzene sulfonate present and no foam generated.

| Example | Additive | Wt. % | Sec. to Generate cc. 500 | 600 | 700 | Total Foam | Drainage at 1 m. | 2 m. | 5 m. |
|---|---|---|---|---|---|---|---|---|---|
| 1 | None | | 55 | | | 550 | 40 | 75 | 120 |
| 2 | Ethanol | 5 | 41 | | | 560 | 30 | 60 | 112 |
| 3 | Ethanol | 20 | 34 | | | 585 | 15 | 40 | 100 |
| 4 | Isopropanol | 5 | 35 | | | 590 | 10 | 35 | 100 |
| 5 | Isopropanol | 20 | 21 | 47 | 120 | 700 | 8 | 10 | 55 |
| 6 | Isopropanol | 40 | 8 | 36 | 75 | 780 | 5 | 10 | 40 |
| 7 | n-Butanol | 20 | 21 | 40 | 86 | 760 | 3 | 10 | 45 |
| 8 | Isobutanol | 20 | 21 | 40 | 90 | 730 | 5 | 10 | 50 |
| 9 | t-Butyl Alcohol | 5 | 28 | 82 | | 650 | 5 | 15 | 70 |
| 10 | t-Butyl Alcohol | 10 | 22 | 48 | 112 | 700 | 5 | 10 | 58 |
| 11 | t-Butyl Alcohol | 40 | 14 | 38 | 57 | 820 | 3 | 10 | 40 |
| 12 | Crude t.B.A. | 20 | 19 | 37 | 52 | 770 | 5 | 10 | 48 |
| 13 | Crude t.B.A. | 20 | 83 | 56 | 103 | 710 | 5 | 10 | 40 |
| 14 | Amyl Alcohol | 20 | 31 | 70 | | 680 | 8 | 15 | 70 |
| 15 | Ethylene Glycol | 20 | 50 | | | 550 | 40 | 68 | 118 |
| 16 | Propylene Glycol | 5 | 43 | | | 540 | 35 | 68 | 118 |
| 17 | Propylene Glycol | 40 | 32 | | | 570 | 20 | 50 | 108 |
| 18 | Dipropylene Glycol | 5 | 35 | | | 580 | 15 | 40 | 100 |
| 19 | Dipropylene Glycol | 20 | 17 | 47 | | 695 | 5 | 10 | 60 |
| 20 | Dipropylene Glycol | 40 | 22 | 40 | 90 | 730 | 5 | 10 | 42 |
| 21 | Tripropylene Glycol | 20 | 28 | 47 | 106 | 700 | 5 | 10 | 52 |
| 22 | D.P.G. BTMS.[1] | 10 | 37 | 83 | | 660 | 5 | 15 | 70 |
| 23 | D.P.G. BTMS/t.B.A. | 10/10 | 17 | 37 | 91 | 740 | 5 | 10 | 45 |
| 24 | Glycerine | 20 | 53 | | | 550 | 38 | 68 | 118 |
| 25 | Hexylene Glycol | 20 | 22 | 40 | 90 | 730 | 3 | 10 | 45 |
| 26 | Acetone | 20 | 30 | 100 | | 600 | 10 | 20 | 80 |
| 27 | Methylethyl Ketone | 20 | 30 | 63 | | 690 | 5 | 10 | 50 |
| 28 | Ethyl Acetate | 20 | 28 | 55 | | 650 | 8 | 12 | 60 |

—Continued

| Example | Additive | Wt. % | Sec. to Generate cc. 500 | 600 | 700 | Total Foam | Drainage at 1 m. | 2 m. | 5 m. |
|---|---|---|---|---|---|---|---|---|---|
| 29 | Sodium N.T.A. | 10 | 48 | | | 540 | 35 | 60 | 115 |
| 30 | No LAS - t-Butyl Alc | 100 | — | 20cc Foam Disappeared Immediately | | | | | |
| 31 | No LAS - D.P. Glycol | 100 | — | No Foam | | | | | |

(1)Still bottoms containing approximately
58% Dipropylene Glycol
35% Tripropylene Glycol
7% Heavier Glycols & Unknown Examples 32 through 39 were made using a frothing agent containing 60 weight per cent of a linear alkyl benzene sulfonate having an average of 11.3 carbon atoms in the chain with x maximum spread of 4 carbon atoms. The procedures followed were as indicated for examples 1 through 31. For comparative purposes, Example 32 was a run using as the frothing agent a linear alkyl benzene sulfonate without the additives of this invention.

| Example | Additive | Wt. % | Sec. to Generate cc. 500 | 600 | 700 | Total Foam | Drainage at 1 m. | 2 m. | 5 m. |
|---|---|---|---|---|---|---|---|---|---|
| 32 | None | | | | | 300 | 150 | 150 | 152 |
| 33 | t-Butyl Alcohol | 20 | 31 | 71 | | 660 | 5 | 15 | 70 |
| 34 | Crude t-B.A. | 20 | 45 | 92 | | 620 | 8 | 15 | 70 |
| 35 | Dipropylene Glycol | 20 | 45 | | | 540 | 30 | 55 | 110 |
| 36 | D.P.G. BTMS(2) | 20 | 56 | | | 580 | 10 | 20 | 80 |
| 37 | D.P.G. BTMS(2) | 20 | 41 | | | 595 | 10 | 25 | 90 |
| 38 | Tripropylene Glycol | 20 | 33 | 83 | | 600 | 10 | 15 | 70 |
| 39 | Hexylene Glycol | 20 | 31 | 68 | | 610 | 10 | 15 | 70 |

(2)See footnote (1) from Examples 1 through 31

The preceding examples are merely exemplary of the teachings of the invention and are not intended to limit the scope in any manner.

What is claimed:

1. A frothed gypsum slurry wherein the frothing agent comprises:
   a. 20 to 70 weight per cent alkyl benzene sulfonate having a branched or linear side chain with an average carbon content ranging from 6 to 15 and a maximum carbon number spread of 8,
   b. 5 to 40 weight per cent of a compound having between 2 and 9 carbon atoms selected from the group consisting of monohydric alcohols, glycols, glycol ethers, ketones, and mixtures thereof, and
   c. 0 to 75 weight per cent water.
2. The frothed gypsum slurry of claim 1 wherein the sulfonate has an average carbon content of 9.5 to 12.5 and the carbon number spread is a maximum of 5.
3. The frothed gypsum slurry of claim 1 wherein (b) is a monohydric alcohol containing 2 to 5 carbon atoms.
4. The frothed gypsum slurry of claim 3 containing 5 to 20 percent by weight t-butyl alcohol.
5. The frothed gypsum slurry of claim 3 containing 20 to 40 per cent by weight of isopropanol.
6. The frothed gypsum slurry of claim 1 wherein (b) is a glycol containing 4 to 7 carbon atoms.
7. The frothed gypsum slurry of claim 6 wherein the glycol is hexylene glycol.
8. The frothed gypsum slurry of claim 1 wherein (b) is a ketone containing 3 to 6 carbon atoms.
9. The frothed gypsum slurry of claim 8 wherein the ketone is methylethyl ketone.
10. The frothed gypsum slurry of claim 1 wherein the (b) is a glycol ether containing 4 to 9 carbon atoms.
11. The frothed gypsum slurry of claim 10 wherein the glycol ether is selected from the group consisting of di and tri propylene glycols.
12. The frothed gypsum slurry of claim 10 wherein a mixture of glycol ethers is used.

* * * * *